H. A. HANZE.
FIXTURE FOR COMPUTING SCALES OR THE LIKE.
APPLICATION FILED JULY 6, 1912.

1,047,214.

Patented Dec. 17, 1912.
7 SHEETS—SHEET 1.

H. A. HANZE.
FIXTURE FOR COMPUTING SCALES OR THE LIKE.
APPLICATION FILED JULY 6, 1912.

1,047,214.

Patented Dec. 17, 1912.

7 SHEETS—SHEET 2.

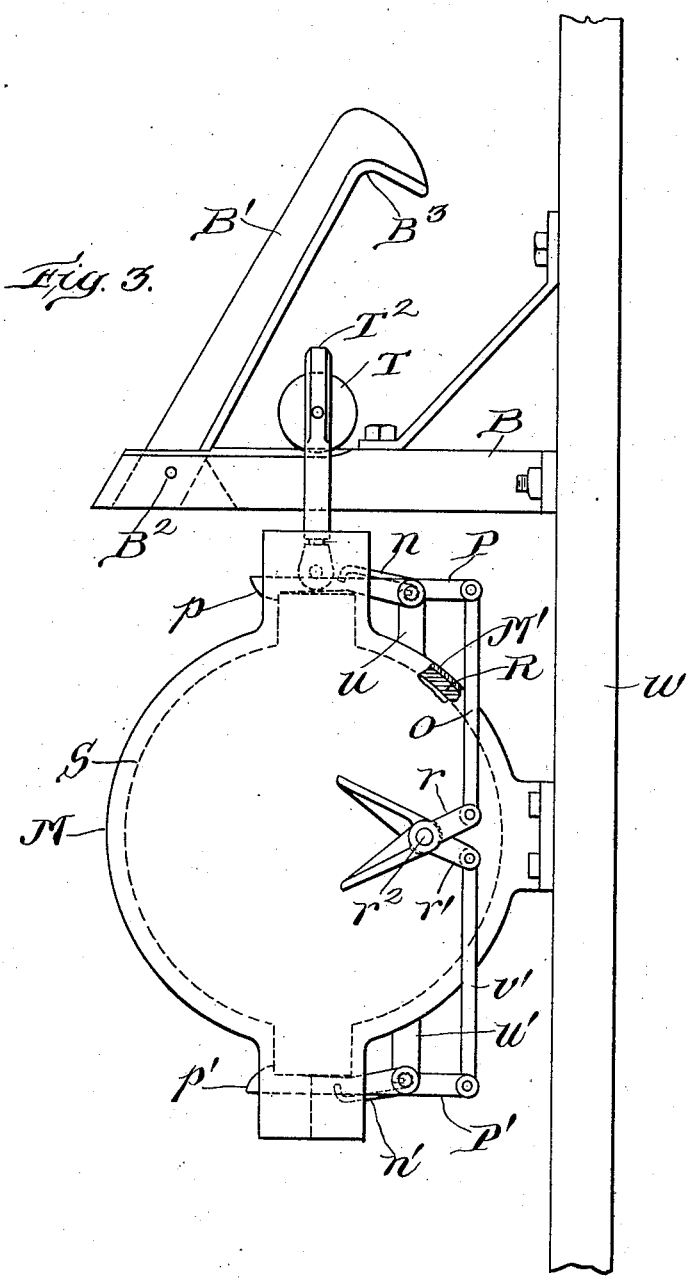

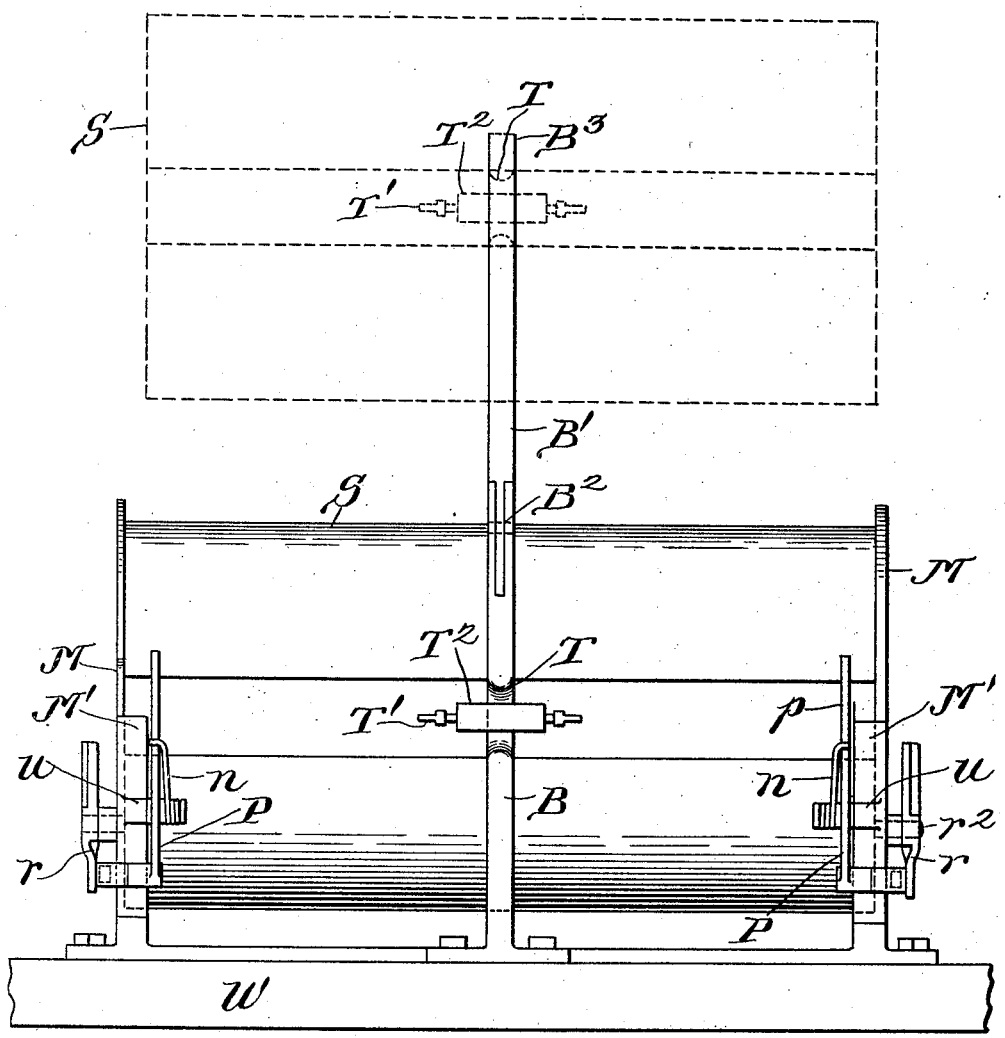

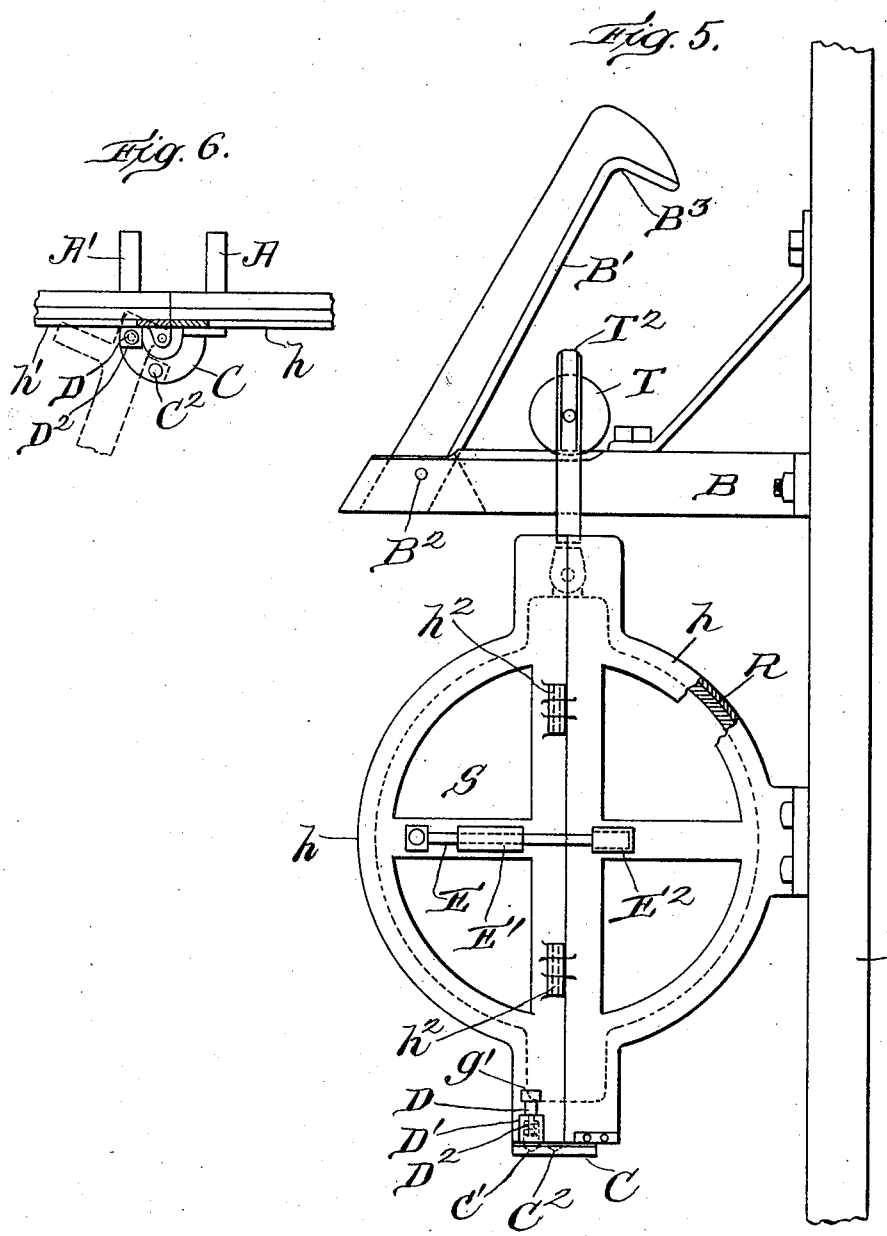

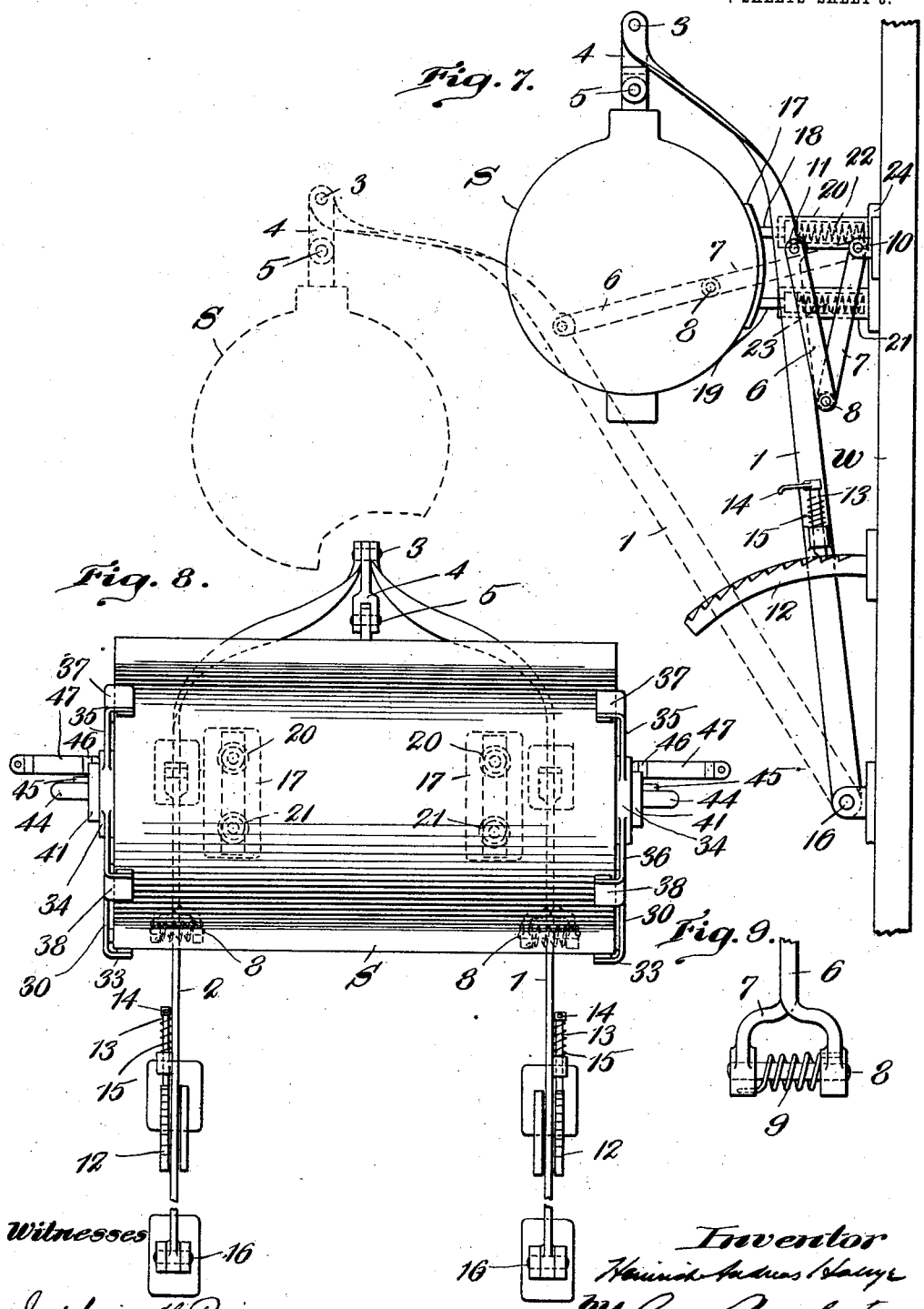

H. A. HANZE.
FIXTURE FOR COMPUTING SCALES OR THE LIKE.
APPLICATION FILED JULY 6, 1912.
1,047,214.
Patented Dec. 17, 1912.
7 SHEETS—SHEET 7.
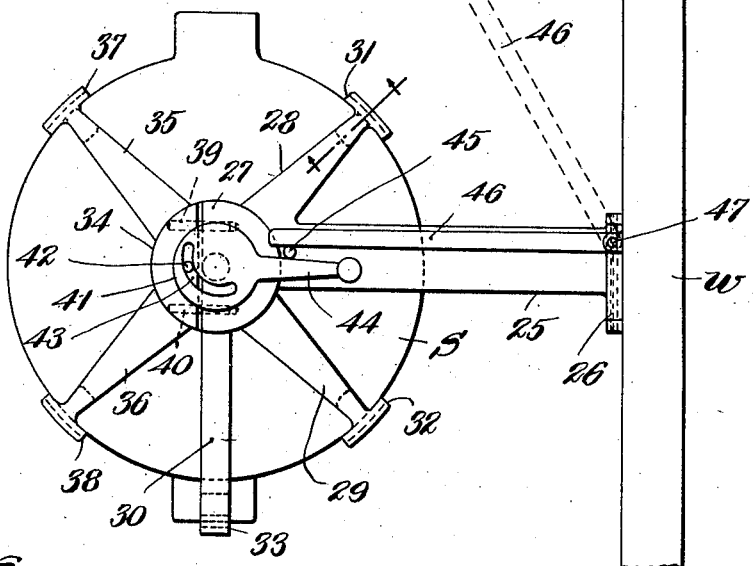
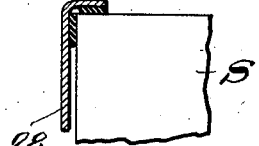
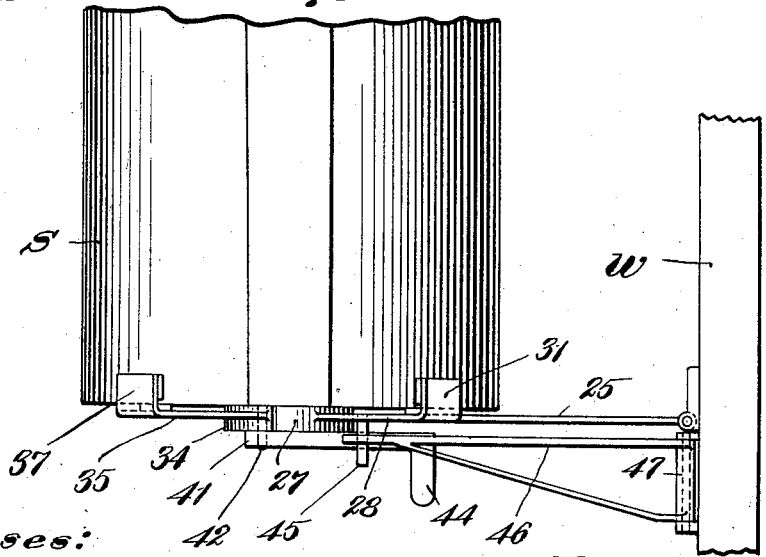
Witnesses:
Inventor

UNITED STATES PATENT OFFICE.

HEINRICH ANDREAS HANZE, OF EVERETT, MASSACHUSETTS.

FIXTURE FOR COMPUTING-SCALES OR THE LIKE.

1,047,214.    Specification of Letters Patent.    Patented Dec. 17, 1912.

Application filed July 6, 1912.   Serial No. 707,985.

*To all whom it may concern:*

Be it known that I, HEINRICH ANDREAS HANZE, a citizen of the United States, and resident of Everett, in the county of Middlesex and State of Massachusetts, have invented new and useful Improvements in Fixtures for Computing-Scales and the Like, of which the following is a specification.

My invention consists in improvements in fixtures for computing scales and like apparatus by means of which the scale may be securely held and protected when not in use and be readily disengaged and brought into position for use.

In particular my improvements are designed to meet the situation presented by provision dealers' wagons in which a computing scale as ordinarily provided is subject to the hard knocks of road travel and therefore is liable to be deranged and rendered inaccurate.

My improvements comprise holding devices which may be secured conveniently to the inside of the wagon top which serves as the base of support and a suspension bracket on which the scale can easily be shifted into or out of its position of security in the holder.

Figure 1:
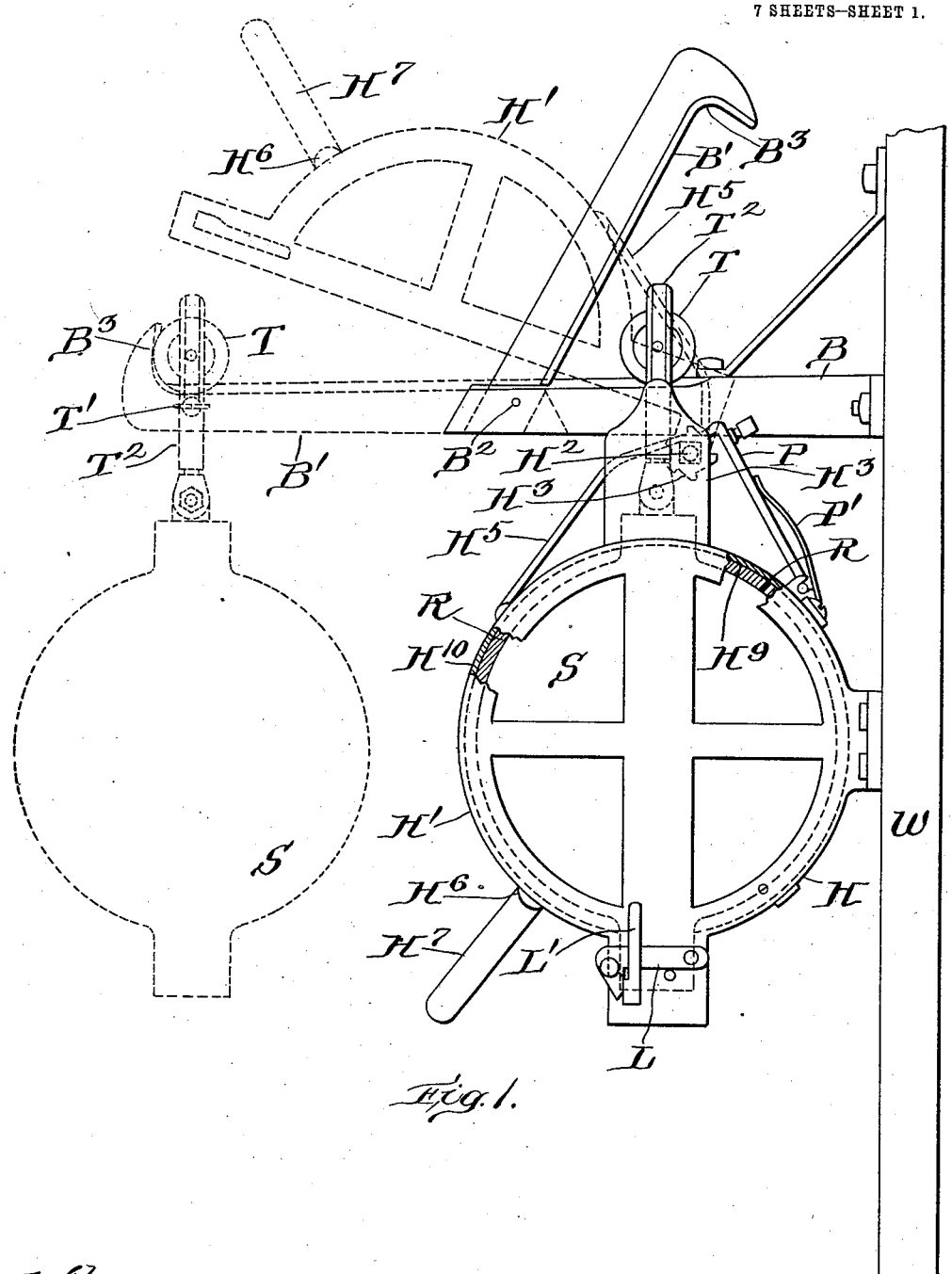
Figure 2:
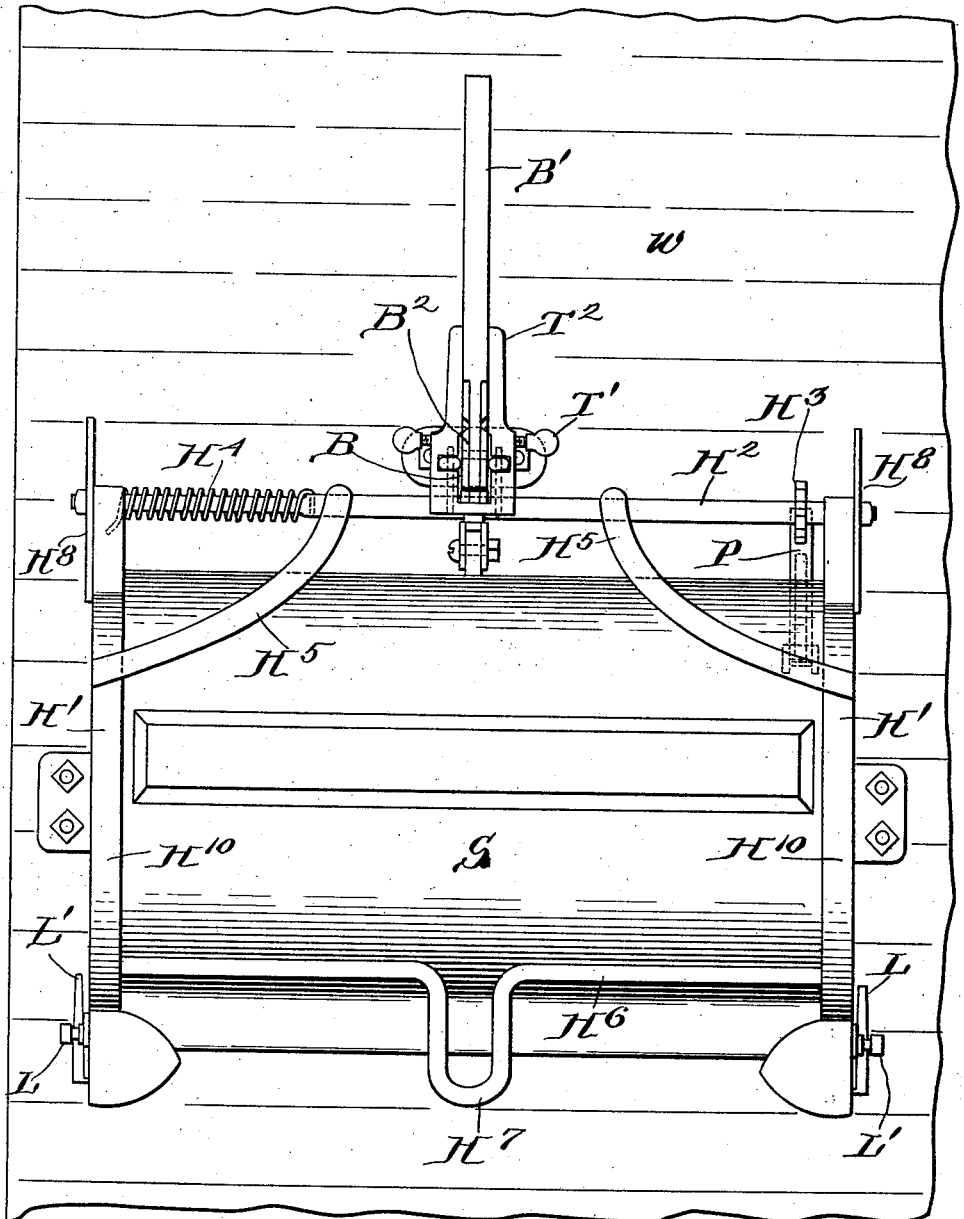

In the drawings hereto annexed which illustrate some of the forms in which my invention may be embodied,—Figure 1 is an end elevation of a fixture for computing scales and the like; Fig. 2 is a side elevation of the same with a computing scale in position therein; Fig. 3 is an end elevation of a modified form of my invention; Fig. 4 is a top plan view of the form shown in Fig. 3; Fig. 5 is an end elevation of another form in which my invention may be embodied; Fig. 6 is a front elevation of the form shown in Fig. 5; Fig. 7 is an end elevation of another form in which my invention may be embodied; Fig. 8 is a front elevation of the form shown in Fig. 7; Fig. 9 shows in detail the spring-toggle joint of Figs. 7 and 8; Fig. 10 is an end elevation showing the holder to be used with the apparatus of Fig. 7; Fig. 11, is a plan view of the holder of Fig. 10; and Fig. 12 is a detail, in section on the line 12 of Fig. 11.

Referring first to Figs. 1 and 2, W represents an upright partition or frame work, for instance the side of a covered provision wagon which serves as the base for my improved fixture. To this supporting partition there is attached the suspension bracket B which for the sake of convenience is provided with an extension B' pivoted to the main portion of the bracket at $B^2$ and furnished with an upstanding hook $B^3$. When the extension B' is turned down the engaging faces of the extension and main portion B are so beveled or undercut that the extension stands in the position shown in dotted lines in Fig. 1. The upper edge of the bracket with its extension is chamfered or rounded so as to form a track for the traveler trolley T. The traveler to which the trolley is attached consists of a hanger $T^2$ on the lower side of which the computing scale or like apparatus in suspended. Thumb screws T' are threaded into holes in the hanger $T^2$ and by means of these thumb nuts the traveler may be fixed at any desired point on the extended bracket.

On the base W, below the bracket B and in such relation thereto that the computing scale S may be held within it while the scale is still attached to the traveler $T^2$ there is fixed the holder which consists of cheek pieces H which like the bracket B are secured firmly to the support W. Each of these cheek pieces has an upwardly extending plate $H^8$ in which are formed bearings for the pivot-rod $H^2$. This pivot-rod is rigidly secured to two side clamps H' which together form clasping means by which the computing scale is securely held within and between the cheek pieces H. The two clamping plates H' are braced to the pivot-rod $H^2$ by means of curved brace rods $H^5$ and are further stiffened by means of the transverse rod $H^6$ which is offset at $H^7$ so that the clasping means thus pivotally related to the cheek pieces H, H', may clear the ends of the extension B' of the bracket. A coiled spring $H^4$ wound around the pivot-rod $H^2$ exerts its stress so as to assist in lifting the clasping means to the position shown in dotted lines in Fig. 2. A ratchet wheel $H^3$ secured to the pivot-rod $H^2$ engages with the pawl P which is normally under control of the spring P', so that when the framework comprising the plates H', H', is lifted to the position shown in dotted lines in Fig. 1, the pawl P will engage the ratchet wheel $H^3$ and hold the clasping devices in elevated position. The computing scale being then free to be withdrawn from its position between the cheek pieces H may be rolled out along the extension bracket and if desired or necessary may be secured by means of the thumb screws T', so as to hang in any position such for instance as that shown in dotted lines in Fig. 1. When the scale is no longer needed the scale pan (not shown) is removed, the traveler $T^2$ released and the scale restored to its position between the cheek pieces H. (These cheek pieces are provided with elastic padding such as rubber shown at R on the inside of the semicircular flanges $H^9$). Then the pawl P is lifted and the clasping devices, pivotally related to the cheek pieces J are swung down to embrace the computing scale and confine it closely within the semicircular flanges $H^{10}$, which like the flanges $H^9$ are preferably provided with elastic padding. By these means the computing scale is held securely and in a safe position and the clasping means are then locked by bringing the latches L into engagement with the clips L'.

An alternative mode by which the functional relationships which reside in the above described apparatus may be expressed is shown in Figs. 3 and 4. In the devices here illustrated the bracket, traveler and computing scale are the same and in the same relationship as in the apparatus of Figs. 1 and 2 and need not be further described. In this form, however, the cheek pieces M are completely circular that is to say, of such size and shape that they overlie and protect the ends of the computing scale S. The rear portion of these pieces is provided with the flanges M' which like the flanges $H^9$ of Fig. 1, are padded on the inside. The clasping members pivotally related to the cheek pieces are represented in Figs. 3 and 4 by the latches P, P', which have hooked ends $p, p$, adapted to engage with the upper and lower parts of the scale S and when so engaged to hold the scale firmly pressed against the elastic padding R with which the cheek pieces M are furnished. The latches P, P', are normally urged into position of engagement with the scale by means of springs $n, n$, which are coiled around the pivots on which the latches turn, these pivots being provided in the studs $u, u$. To release the scale from its engagement by the holder the scissors-arms $r, r$, are brought together and act through the links $o, o'$ to disengage the hooked ends $p, p'$ from the computing scale S which may then be rolled out on its traveler to position for use. When the scale is restored to the holder as shown in Figs. 3 and 4, it needs only to be pushed in, since the hooked ends $p, p'$ are automatically opened and closed when the scale S is pushed between them.

Another arrangement illustrative of my invention is shown in Figs. 5 and 6. Here the cheek pieces represented by $h$ are roughly speaking semicircular and the clasping means are represented by similar plates $h'$ which are hinged to and therefore in pivotal relation with the cheek pieces $h$, by means of hinges $h^2$. The cheek pieces $h$ are provided on the inside with short retaining studs shown at A in the detailed view of Fig. 6 and the pivotally mounted clasping members $h'$ have similar studs such as A', these studs are so placed that when the clasping means are closed the upper and lower portions of the scale S (such as the lower protuberance S') will be clasped between the studs A, A'. A semicircular plate C is secured to each of the cheek pieces $h$. Two or more depressions or holes such as C', $C^2$, are made in the semicircular plate C so as to coöperate with the spring catch D which is mounted in the lug D' on the hinged clasping member $h$, and is urged downwardly by the spring $D^2$. To secure the scale in position in the holding devices it is rolled along the bracket B until it rests between the cheek pieces $h$ and presses against the elastic padding R, then the hinged members $h'$ which previously were in the position indicated by the dotted lines in Fig. 6 and were held in that position by engagement of each catch D with a hole $C^2$ are swung inwardly so as to embrace the ends of the scale S. Each catch D drops into a hole C' and then the bolt E sliding in the ward E' on each hinged member $h'$ is slid forward so as to engage with the socket $E^2$ and thus holds the pivotally related members $h, h'$ securely in position.

Figs. 7 to 12 inclusive illustrate another form in which my invention may be expressed, and in which the moving support for the scale swings from a pivot instead of sliding on a bracket. The holder (not shown in Fig. 7) is of the same general character as that illustrated in the figures hereinabove described.

Referring to Figs. 7 and 8; the support for the scale S comprises two pivoted arms, 1 and 2, pivotally secured at 16 to the base W. These arms converge at their upper ends, and are joined at 3; a link 4 depending from the joint 3, holds the scale S as by a pin 5. Each of the arms 1 and 2 is also connected with the base by a spring toggle, comprising links 6 and 7 pivoted respectively on arm 1 (or 2) and to the base W. The toggle links 6 and 7 are offset at the joint 8 (Fig. 9) so as to afford space for the spring 9, which is so secured to the links 6 and 7 as constantly to exert a closing effort on the toggle. Rack sectors 12, secured to the base W, serve to hold and guide the arms 1 and 2. On each of the arms there is provided a spring controlled catch pin 13, which has a handle 14, and is pressed toward the sector 12 by the spring 15.

The dotted lines in Fig. 7 show how the toggle 6—7 limits the swing of the scale S away from the base W. The scale and its support may be held at any intermediate position by the catch pins 13, which may be turned through about 180° by the handles 14, so as to engage the teeth of the sectors 12.

Cushions 17 are provided, against which the scale S rests when moved to position to be clasped by the holder. These cushions are mounted on rods 18, 19, which enter cylindrical projections 20, 21, secured to the base W by the plate 24. Springs 22, 23 in the cylinders afford yielding resistance and provide the cushioning effect. The holder is shown in Figs. 8, 10 and 11. The two members of the holder are alike, except that one is right and the other left handed, so that a description of one will suffice. A swing-bracket 25, pivoted in the base W at 26, terminates in a plate 27, from which arms 28, 29, 30, radiate, these being provided at their extremities with padded clasping bends 31, 32, and 33. A plate 34, mounted on pins which enter holes in plate 27, is provided with arms 35, 36, which have padded clasping-bends 37, 38, respectively. A pin 42, secured to plate 34, enters the eccentric slot 43 in the locking plate 41, which is provided with a handle 44. A securing bracket 46, pivoted on the base W at 47 is adapted to bear against the side of plate 27, and to rest on pin 45, secured in the bracket arm 25.

The operation of the devices shown in Figs. 7–12 inclusive, is as follows: Assuming the scale S to be held to the base W as in Fig. 10; to release it, the handles 44 are swung down, the eccentric slot in plate 41 causes the plate 34 to move outward, and the clasping bends 31, 32, 33, 37 and 38 are thus made to relax their hold on the scale S. Securing brackets 46 are lifted, brackets 25 are swung away from the scale S. The catch pins 13 (Fig. 7) are released if necessary, and the scale S allowed to swing out, supported by the arms 1 and 2. Springs 9 (Fig. 9) ease the outward movement of the scale S, and assist its inward movement toward the base W. To secure the scale S in the holder the above described operations are performed in reverse order.

By means of the contrivance above described an apparatus such as a computing scale will be protected against rough usage and may be securely carried upon a provision wagon or the like over rough roads and nevertheless be much more readily brought into position for use than is at present the case.

What I claim and desire to secure by Letters Patent is:

1. In a fixture for computing scales and the like, a support adapted to securement to a base, and movable inward and outward in relation to the base, and a holder comprising clasping means, likewise adapted to securement to the base, to embrace and hold the scale or like object suspended on the support, said clasping means being movable into and out of engagement with the scale or like object.

2. In a fixture for computing scales and the like, a support adapted to securement to a base, and movable inward and outward in relation to the base, and a holder comprising clasping means, likewise adapted to securement to the base, to embrace and hold the scale or like object suspended on the support, said clasping means being movable into and out of engagement with the scale or like object, and fastening devices to release the clasping means in holding position.

3. In a fixture for computing scales and the like, the combination of a support adapted to securement to a base and movable inward and outward in relation to the base, and a holder frame comprising clasping means thereon movable to embrace the scale or like object when brought near the base by movement of the support.

4. In a fixture for computing scales and the like, the combination of a supporting bracket, a traveler to move in and out thereon, comprising means to hold a scale or the like at substantially constant level, and a holder, comprising clasping means near the base of the traveler to embrace and hold the scale or like object suspended from the traveler, said clasping means being movable into and out of engagement with the scale or like object, and fastening devices to retain the clasping means in holding position.

5. In a fixture for computing scales and the like, the combination of a supporting bracket, a traveler thereon, and a holder-frame comprising cheek-pieces and clasping means pivotally related to the cheek-pieces, to embrace and hold the scale or like object suspended from the traveler, and a catch to hold the clasping means in open position.

6. In a fixture for computing scales and the like, the combination of a supporting bracket, a traveler thereon, means to secure the traveler on the bracket in any desired position, and a holder-frame comprising cheek-pieces and clasping means pivotally related to the cheek-pieces, to embrace and hold the scale or like object suspended from the traveler.

7. In a fixture for computing scales and the like, the combination of a supporting bracket, a traveler thereon, and a holder-frame comprising cheek-pieces and clasping means pivotally related to the cheek-pieces, to embrace and hold the scale or like object suspended from the traveler, a catch to hold the clasping means in open position, and fastening devices to secure the clasping means when closed.

8. In a fixture for computing scales, and the like, the combination of a supporting bracket, a traveler thereon, and a holder-frame comprising cheek-pieces shaped to fit the scale or like object, and clasping means pivotally related to the cheek-pieces to embrace and hold the scale or like object suspended from the traveler, said traveler being extensible to allow the object to hang clear of the remainder of the fixture.

9. In a fixture for computing scales and the like, the combination of a supporting bracket, a traveler thereon, and a holder-frame comprising cheek pieces shaped to fit the scale or like object, and clasping means pivotally related to the cheek-pieces to embrace and hold the object suspended from the traveler, said traveler being extensible to allow the object to hang clear of the remainder of the fixture, and a catch to hold the clasping means in open position.

10. In a fixture for computing scales and the like, the combination of a supporting bracket, a traveler thereon, and a holder-frame comprising cheek-pieces shaped to fit the scale or like object, and clasping means pivotally related to the cheek-pieces to embrace and hold the object suspended from the traveler, said traveler being extensible to allow the object to hang clear of the remainder of the fixture, a catch to hold the clasping means in open position, and fastening devices to secure the clasping means when closed.

11. In a fixture for computing scales and the like, the combination of a supporting bracket, a traveler thereon, means to secure the traveler on the bracket in any desired position, and a holder-frame comprising cheek-pieces and clasping means pivotally related to the cheek-pieces, to embrace and hold the scale or like object suspended from the traveler, and a catch to hold the clasping means in open position.

12. In a fixture for computing scales and the like, the combination of a supporting bracket, a traveler thereon, means to secure the traveler on the bracket in any desired position, and a holder-frame comprising cheek-pieces and clasping means pivotally related to the cheek-pieces to embrace and hold the scale or like object suspended from the traveler, a catch to hold the clasping means in open position, and fastening devices to secure the clasping means when closed.

13. In a fixture for computing scales and the like, the combination of a supporting bracket, a traveler thereon, means to secure the traveler on the bracket in any desired position, and a holder-frame comprising cheek-pieces shaped to fit the scale or like object and clasping means pivotally related to the cheek-pieces to embrace and hold the scale or like object suspended from the traveler, said traveler being extensible to allow the scale or like object to hang clear of the remainder of the fixture.

14. In a fixture for computing scales and the like, the combination of a supporting bracket, a traveler thereon, means to secure the traveler on the bracket in any desired position, and a holder-frame comprising cheek-pieces shaped to fit the scale or like object and clasping means pivotally related to the cheek-pieces to embrace and hold the scale or like object suspended from the traveler, said traveler being extensible to allow the scale or like object to hang clear of the remainder of the fixture, and a catch to hold the clasping means in open position.

15. In a fixture for computing scales and the like, the combination of a supporting bracket, a traveler thereon, and a holder-frame comprising cheek-pieces shaped to fit the scale or like object, and clasping means pivotally related to the cheek-pieces to embrace and hold the scale or like object suspended from the traveler, said traveler being extensible to allow the scale or like object to hang clear of the remainder of the fixture, a catch to hold the clasping means in open position, and fastening means to secure the clasping means when closed.

16. In a fixture for computing scales and the like, the combination of a supporting bracket, a traveler thereon, and a holder-frame comprising cheek-pieces and clasping means pivotally related to the cheek-pieces, to embrace and hold the scale or like object suspended from the traveler, and elastic padding on the fixture.

17. In a fixture for computing scales and the like, the combination of a supporting bracket, a traveler thereon, and a holder-frame comprising cheek-pieces and clasping means pivotally related to the cheek-pieces, to embrace and hold the scale or like object suspended from the traveler, elastic padding on the fixture and a catch to hold the clasping means in open position.

18. In a fixture for computing scales and the like, the combination of a supporting bracket, a traveler thereon, and a holder-frame comprising cheek-pieces and clasping means pivotally related to the cheek-pieces, to embrace and hold the scale or like object suspended from the traveler, elastic padding on the fixture, a catch to hold the clasping means in open position, and fastening devices to secure the clasping means when closed.

19. In a fixture for computing scales and the like, the combination of a supporting bracket, a traveler thereon, and a holder-frame comprising cheek-pieces shaped to fit the scale or like object, and clasping means pivotally related to the cheek-pieces to embrace and hold the scale or like object suspended from the traveler, elastic padding on the fixture, said traveler being extensible to allow the scale or like object to hang clear of the remainder of the fixture.

20. In a fixture for computing scales and the like, the combination of a supporting bracket, a traveler thereon, and a holder-frame comprising cheek-pieces shaped to fit the scale or like object, and clasping means pivotally related to the cheek-pieces to embrace and hold the scale or like object suspended from the traveler, elastic padding on the fixture, said traveler being extensible to allow the scale or like object to hang clear of the remainder of the fixture, a catch to hold the clasping means in open position, and fastening devices to secure the clasping means when closed.

Signed by me at Boston, Massachusetts, this 24th day of June, 1912.

HEINRICH ANDREAS HANZE.

Witnesses:
 CHARLES D. WOODBERRY,
 JOSEPHINE H. RYAN.

Copies of this patent may be obtained for five cents each, by addressing the "Commissioner of Patents, Washington, D. C."